United States Patent [19]

Akimoto

[11] Patent Number: 4,564,239
[45] Date of Patent: Jan. 14, 1986

[54] VEHICLE SEAT CUSHION

[75] Inventor: Hisayoshi Akimoto, Atsugi, Japan

[73] Assignee: Ikeda Bussan Co., Ltd., Yokohama, Japan

[21] Appl. No.: 439,749

[22] Filed: Nov. 8, 1982

[51] Int. Cl.⁴ .............................................. A47C 31/02
[52] U.S. Cl. ................................... 297/452; 297/219
[58] Field of Search ............... 297/452, 226, 225, 224, 297/229, 219, 218

[56] References Cited

U.S. PATENT DOCUMENTS

| 2,567,579 | 9/1951 | Russell | 297/218 |
| 3,102,755 | 9/1963 | Wilfert | 297/229 |
| 3,652,373 | 3/1972 | Noble | 297/219 |
| 3,657,750 | 4/1972 | Staley | 297/219 |
| 3,727,980 | 4/1973 | Tischler | 297/452 |
| 4,337,931 | 7/1982 | Mondell et al. | 297/452 |
| 4,364,607 | 12/1982 | Tamburini | 297/452 |

FOREIGN PATENT DOCUMENTS

| 611672 | 1/1961 | Canada | 297/219 |
| 2023803 | 12/1971 | Fed. Rep. of Germany | 297/452 |
| 2913473 | 10/1980 | Fed. Rep. of Germany | 297/452 |
| 2486922 | 1/1982 | France | 297/452 |
| 950122 | 2/1964 | United Kingdom | 297/218 |
| 2097253 | 11/1982 | United Kingdom | 297/219 |

Primary Examiner—William E. Lyddane
Assistant Examiner—Mark W. Binder
Attorney, Agent, or Firm—McAulay, Fields, Fisher, Goldstein & Nissen

[57] ABSTRACT

There is disclosed an end structure of a surface material of a vehicle seat cushion which is disposed on the lower rails of a vehicle so as to be slidable in the forward and backward direction of the vehicle. On an end portion of the surface material covering the upper surface of a cushioning material fixed on a seat frame there is provided at least one connection piece at a position opposed to the outer periphery of the frame, each connection piece is fixed to the outer peripheral side of the frame and at the same time the lower edge of the surface material is extended to a position lower than the connection piece to form a cover surface to conceal the mounting portion of the connection piece to the frame. Thus, the mounting portion is prevented from being seen from the outside thereby making the seat cushion aesthetically attractive. The lower edge of the surface material can be protected from damages.

10 Claims, 5 Drawing Figures

VEHICLE SEAT CUSHION

BACKGROUND OF THE INVENTION

This invention relates to an end structure of a surface material of a vehicle seat cushion which is disposed on lower rails in a vehicle so as to be slidable in the forward and backward direction of the vehicle.

A conventional vehicle seat cushion is illustrated as a fragmentary cross-sectional view in FIG. 1. The conventional vehicle seat cushion S which comprises a frame 1 formed of a resin or a metallic material, springs 2 stretched inside the frame 1, a cushioning material 3 such as foamed polyurethane positioned over the frame 1 and the springs 2, and a surface material 4 covering the surface of the cushioning material 3. The surface material 4 consists of plural pieces of cloth sewed together in the form of a bag, and it has an end portion 5 which inwardly extends along the bottom of the seat cushion S and fixed via worm clips 6 or the like to holes 7 formed through the frame 1. To the bottom face of the seat cushion S there are fixed upper rails 8 which are slidably positioned on their corresponding lower rails (not shown), the upper rails 8 being fixed with screws or the like (not shown) to the frame 1 with the surface material 4 interposed therebetween.

However, a vehicle seat cushion having the aforesaid construction has a drawback such that, since the upper rails 8 are fixed onto the end portion 5 of the surface material 4, the pressure of the upper rails 8 is exerted on the end portion 5 during the use of the seat cushion over a long period of time and this pressurized portion m may be cracked resulting in the end portion 5 being split off at the crack. It has further drawbacks, for example, when mounting the upper rails 8, a jig or the like for mounting the upper rails 8 may strike against and damage the end portion 5, or since it is required to form holes through the end portion 5 for the insertion of mounting screws for the upper rails 8, the end portion 5 may be torn from those holes when an excessive pulling force is exerted thereon.

It might be one solution to the above problems of conventional seat cushions to fix the end portion 5 of the surface material 4 to the outermost periphery l of the frame 1 so that the end portion 5 does not extend inwardly between the upper rails 8 and the frame 1. This method is, however, accompanied by another drawback that, since each worm clip for fixing the end portion 5 is positioned on the outer peripheral side l, it is visible from the outside, thus undesirable from the aesthetic standpoint.

SUMMARY OF THE INVENTION

It is a first object of this invention to provide a vehicle seat cushion wherein a connection piece is provided at the end portion of the surface material, the connection piece being fixed to a side wall of a seat frame, whereby it is intended to prevent the pressure of the upper rails from being exerted on the end portion of the surface material, to eliminate the necessity of forming holes through the end portion of the surface material for the insertion of upper rail mounting screws thereby increasing the strength of the end portion of the surface material, and to protect this end portion from damages which may be caused when the upper rails are secured to the lower surface of the seat frame by means of a jig.

It is a second object of this invention to provide a vehicle seat cushion wherein a covering is provided over the end portion of the surface material to conceal the mounting portion of the connection piece to the frame.

Other objects, features and advantages of this invention will become apparent from the following detailed description of a preferred embodiment of the invention taken in conjunction with the accompanying drawings.

DETAILED DESCRIPTION OF THE PREFERRED EMBODIMENT OF THE INVENTION

Figure 1:
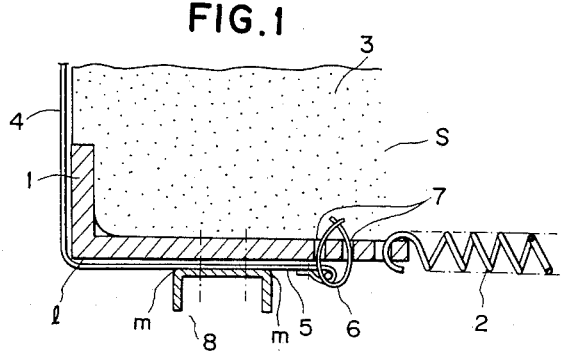
FIG. 1 is a fragmentary cross-sectional view of a conventional vehicle seat cushion.
Figure 2:
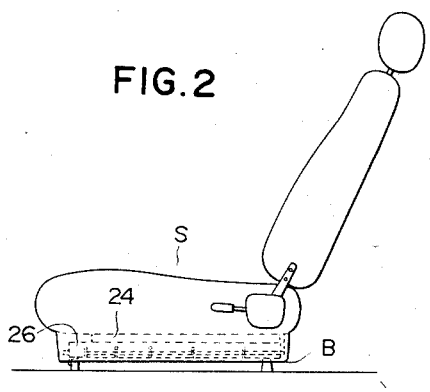
FIG. 2 is a side view of a vehicle seat cushion according to a preferred embodiment of this invention.
Figure 3:
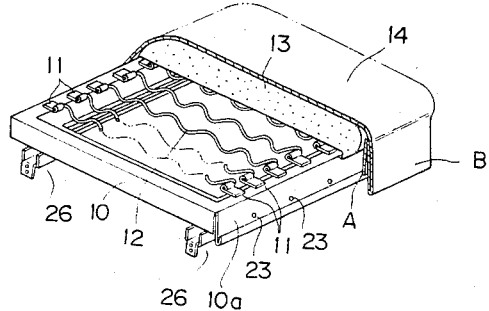
FIG. 3 is a partially cut-away perspective view showing the main portion of the cushion of the preferred embodiment.
Figure 4:
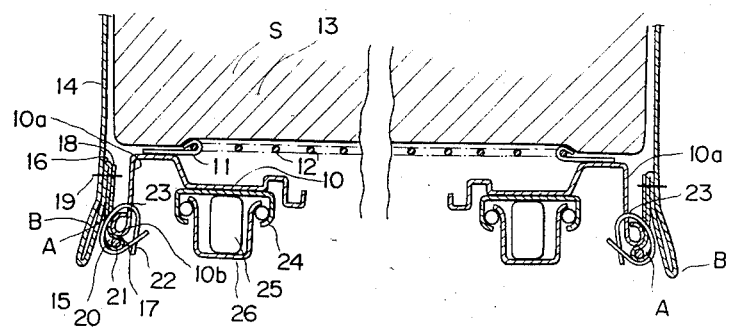
FIG. 4 is an enlarged, fragmentary, cross-sectional view of the vehicle seat cushion of the preferred embodiment.
Figure 5:
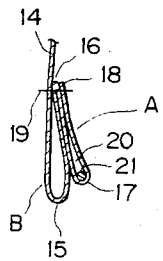
FIG. 5 is a cross-sectional view showing in an enlarged scale the end portion of the surface material of the vehicle seat cushion of the preferred embodiment.

In FIGS. 2 through 5, the reference numeral 10 indicates a frame having a downwardly bent piece 10a on its outer peripheral side, the tip end portion of the bent piece 10a being turned up at 10b in the form of a tube with holes 23 being formed in the upper portion of the bent piece 10b. To the frame 10 there are fixed hooks 11 to which are connected S-shaped springs 12. Disposed over the frame 10 and the springs 12 is a cushioning material 13 formed of foamed polyurethane or the like. The surface of the cushioning material 13 and the side walls of the frame 10 are entirely covered with a surface material 14. The lower portion of the surface material 14, as shown in FIG. 5, is turned up three times in an inwardly meandering manner to form first, second and third turnup portions 15, 16, 17, with the second turnup portion 16 and a tip end portion 18 being machine-sewed at 19 to the downwardly extending portion of the surface material. In a hollow portion 20 formed by the third turnup portion 17 there is inserted a bar-like end wire 21 which is fixed through ring-like clips 22 to holes 23 formed in the bent piece 10a of the frame 10. The frame 10 is fixed onto upper rails 24, the upper rails 24 being slidably mounted through a roller 25 on lower rails 26 which are fixed on the vehicle floor.

According to the above construction, the end portion of the surface material 14 is turned up three times, then the second turnup portion 16 and the tip end portion 18 are sewed to the surface material 14 thereby permitting the formation of a connection piece A and a cover surface B, and the connection piece A is fixed through the clips 22 to the holes 23 formed in the outer peripheral side of the frame 10 whereby the mounting of surface material 14 is made possible. Besides, since the cover surface B projects downwards from the lower surface of the seat cushion S, the clips 22 are thereby covered and prevented from being seen from the outside, thus achieving an improvement in external appearance. According to this invention, moreover, since the end portion of the surface material 14 is not positioned between the upper rails 24 and the frame 10, the pressure of the upper rails 24 is not exerted at all on the end portion of the surface material 14, so that it is possible to eliminate conventional drawbacks such as cutting of this end portion over a long-term use or its partial breakage in contact with a mounting jig when mounting the upper rails 24. Furthermore, since the connection piece A is formed integrally with the surface material 14, its provision does not cause the problem of an increased number of parts. The connection piece A can be formed by a single sewing operation, so that the end processing operation can be simplified. Still furthermore, since the tip end of the bent piece 10a is turned up in the form of a tube, the mechanical strength of the bent piece 10a itself can be enhanced by virtue of the turnup portion 10b; besides, since the holes 23 are formed in the bent piece 10a which is in a vertical state, those holes are easily visible, allowing an easy mounting of the clips 22.

In the hereinbefore described construction of this invention the tip end portion 18 of the surface material 14 is sewed together with the turnup portion 16 to the surface material 14, but this invention is not limited to such a construction. The turnup portion 16 alone may be sewed to the surface material 14, and in this case it goes without saying that a turnup sewing portion for fixing the wire 21 should be provided on the tip end side 18. The connection piece A may be provided separately from the surface material 14.

What is claimed is:

1. A vehicle seat cushion including a frame having an outer peripheral portion, a cushioning material disposed over said frame and a surface material covering throughout said cushioning material with each end portion of said surface material being fixed to said frame, wherein at each end portion of said surface material there is provided a connection piece with a cover portion, said connection piece at a position opposed to the outer periphery of said frame with said connection piece connected to the outer peripheral portion of said frame, and said cover portion of said surface material extended to a position lower than said connection piece to form a depending cover surface for covering and concealing the connection of said connection piece to said frame; said outer peripheral portion of said frame being bent downwards to form a bent piece, a tubular turnup portion at the lower end of said bent piece, holes in the upper side of said turnup portion, ring-like clips adapted to surround said turnup portion pass through said holes, and means associated with said frame for securing said connection piece at opposite ends of said frame with said ring-like clips being hidden from view by said turnup portion.

2. The vehicle seat cushion as set forth in claim 1, wherein said connection piece is formed integrally with said surface material.

3. The vehicle seat cushion as set forth in claim 1, wherein said cover surface projects downwardly from the lower surface of said seat cushion.

4. The vehicle seat cushion as set forth in claim 1, wherein said end portion of said surface material is formed from three folds, two of said folds forming outer folds and being turned upwardly, and a third of said folds forming an intermediate fold between said outer folds and being turned downwardly, and means joining said three folds together with a base of said intermediate fold being joined to said outer folds.

5. The vehicle seat cushion as claimed in claim 4, wherein said means joining said three folds together joins said folds to said end portion of said surface material.

6. The vehicle seat cushion as claimed in claim 4, wherein said joining means fixes said intermediate fold and a tip end portion to a downwardly extending portion of said surface material connected with one of said outer folds.

7. A vehicle seat cushion as claimed in claim 1, further including upper rails fixed to the bottom of said frame, said upper rails being slidably mounted on the floor of said vehicle; the pressure of said upper rails not being exerted on said end portion of said surface material since said end portion is not positioned between said upper rails and said frame, thereby preventing damage in use to said end portion.

8. In combination in a vehicle seat cushion, including a frame having an outer peripheral portion;
a cushioning material disposed over said frame and a surface material covering said cushioning material with each portion of said surface material being fixed to said frame;
wherein each end portion of said surface material has a connection piece with a cover portion; said connection piece being at a position opposed to the outer periphery of said frame with said connection piece connected to the outer peripheral portion of said frame;
said cover portion of said surface material extended to a position lower than said connection piece to form a depending cover surface for covering and concealing the connection of said connection piece to said frame;
said outer peripheral portion of said frame being bent downwards to form a bent piece;
a tubular turnup portion at the lower end of said bent piece;
holes in the upper side of said turnup portion;
ring-like clips adapted to surround said turnup portion pass through said holes and securing said connection piece at opposite ends of said frames; and
upper rails fixed to the bottom of said frame;
said upper rails being slidably mounted on lower rails on the floor of said vehicle; the pressure of said upper rails not being exerted on said end portion of said surface material since said end portion is not positioned between said upper rails and said frame, thereby preventing damage in use to said end portion.

9. The combination of claim 8, wherein:
said turnup portion includes three turnups, two of said turnups forming outer portions and a third of said turnups being between said outer turnups;
one of said outer turnups being connected with a downwardly extending portion of said surface material; and
the other of said outer turnups having a tip end portion, and means connecting said tip end portion with said inner portion to said downwardly extending portion.

10. The combination of claim 9, including:
a bar-like end wire inserted through said third turnup and through said ring-like clips for forming a connection piece proximate to said bent piece for fixing thereto said connection piece, said one of said turnups forming a cover surface for said bent piece to cover the side of said frame and said clips;
spring means and connection means for connecting said spring means to said frame above said bent piece for supporting said cushioning material which together with the side walls of said frame and said bent piece are entirely covered with said surface material.

* * * * *